US005767820A

United States Patent [19]
Bassett et al.

[11] Patent Number: 5,767,820
[45] Date of Patent: Jun. 16, 1998

[54] HEAD-MOUNTED VISUAL DISPLAY APPARATUS

[75] Inventors: Bruce R. Bassett, Palo Alto; Jon Christopher Lake, Mt View; Edgardo A. Caliboso, Sunnyvale, all of Calif.

[73] Assignee: Virtual Research Systems, Santa Clara, Calif.

[21] Appl. No.: 437,535

[22] Filed: May 9, 1995

[51] Int. Cl.⁶ .................................................. G09G 5/00
[52] U.S. Cl. ........................................... 345/8; 345/7
[58] Field of Search ...................... 345/8, 7, 9; 348/53, 348/115; 359/630; 340/980; 434/44

[56] References Cited

U.S. PATENT DOCUMENTS

| | | | |
|---|---|---|---|
| 2,317,989 | 5/1943 | Goldmark | 178/5.2 |
| 2,435,962 | 2/1948 | Goldmark et al. | 178/5.2 |
| 2,955,156 | 10/1960 | Heilig | 178/6.5 |
| 3,059,519 | 10/1962 | Stanton | 88/1 |
| 3,604,839 | 9/1971 | Kitsopoulos | 178/5.4 |
| 3,641,256 | 2/1972 | Davis, Jr. | 178/5.4 |
| 4,028,725 | 6/1977 | Lewis | 358/103 |
| 4,055,004 | 10/1977 | Chase | 35/12 |
| 4,231,117 | 11/1980 | Aileo | 2/6 |
| 4,758,884 | 7/1988 | Roy | 358/66 |
| 4,770,500 | 9/1988 | Kalmanash et al. | 350/347 |
| 4,859,031 | 8/1989 | Berman et al. | 350/174 |
| 4,877,307 | 10/1989 | Kalmanash | 350/132 |
| 4,900,133 | 2/1990 | Berman | 350/346 |
| 4,902,116 | 2/1990 | Ellis | 350/501 |
| 4,933,755 | 6/1990 | Dahl et al. | 358/88 |
| 4,952,024 | 8/1990 | Gale | 350/143 |
| 4,982,278 | 1/1991 | Dahl et al. | 348/53 |
| 4,987,410 | 1/1991 | Berman et al. | 350/705 |
| 4,991,941 | 2/1991 | Kalmanash | 350/347 |
| 5,039,035 | 8/1991 | Fitzpatrick | 244/122 |
| 5,040,058 | 8/1991 | Beamon | 358/103 |
| 5,050,966 | 9/1991 | Berman | 359/38 |
| 5,093,567 | 3/1992 | Staveley | 250/221 |
| 5,276,471 | 1/1994 | Yamauchi et al. | 345/8 |
| 5,334,991 | 8/1994 | Wells et al. | 345/8 |

FOREIGN PATENT DOCUMENTS 0490682  6/1992  European Pat. Off. .

OTHER PUBLICATIONS

Brill, Louis M. "Facing interface issues," *Computer Graphics World*, Apr. 1992, pp. 48–58.

Sutherland, "A head–mounted three dimensional display," *Proceedings of the AFIPS Fall Joint Computer Conference*, 1968, pp. 757–764.

Filer, Bibliography pg. from "A Literature Review of Virtual Environment Display Systems," *A 3–D Virtual Environment Display System*, MS thesis, AFIT/GCS/ENG/89D–2, School of Eng., Air Force Inst. of Tech. (AU), Wright–Patterson AFB, OH , Dec. 1989.

"*Visionary Equipment*", Photonics Spectra, Jun. 1992, p. 70.

"*CyberEye*" by General Reality, Promotional Material, General Reality Company, Apr. 20, 1994.

Kaiser Electro–Optics' "*Vim*", Promotional Materials, Oct. 14, 1994.

"*The Visual Display System You Wear*", Promotional/Specification Materials (CAE–7–3739, CAE electronics, LTD. undated.

(List continued on next page.)

*Primary Examiner*—Regina Liang
*Attorney, Agent, or Firm*—Townsend and Townsend and Crew LLP

[57] ABSTRACT

An improved head-mounted visual display apparatus that may find particular use in a virtual reality system. The apparatus includes a shell that encases a pair of visual displays and is mounted to a headband, which adjusts to the user's head, with a mounting device that allows the shell to be slid towards and away from the user's face. The mounting device includes a mounting bracket that attaches to the headband and a support member that slides across the mounting bracket. The support member is attached to the shell allowing the shell to be moved towards and away from the headband. Additionally, the support member allows for the attachment of video display units.

17 Claims, 13 Drawing Sheets

OTHER PUBLICATIONS

"*Leepvideo System IV*", The Next Generation . . . Telepresence Research, Press Release, undated.

"*Intergrated Helmet Systems With Second Sensor*", SPIE vol. 1456 Large–Screen Projection, Avionic, and Helmet–Mounted Displays (1991), pp. 11–123.

Fisher, Scott S. "*Virtual Environments, Personal Simulation & Telepresence*", Oct. 1989, pp. 1–9 (w/illustrations).

Fisher, Scott S. "*Virtual Interface Environment Workstations*", Proceedings of the Human Factors Society 32nd Annual Meeting–Anaheim, California, vol. 1, Oct. 24–28, 1988, pp. 91–95.

Burbidge, Dick and Murphy, Paul M; "*Hardware Improvements To The Helmet Mounted Projector On The Visual Display Research Tool (VDRT) At The Naval Training Systems Center*", SPIE vol. 1116 Helmet–Mounted Displays (1989), pp. 52–60.

Fisher, Scott S. "*Virtual Environment Display System*", ACM 1986 workshop On Interactive 3D Graphics, Chapel Hill, North Carolina, Oct. 23–24 1986, pp. 1–11.

"*MRG 2*", Head–Mounted Display, Promotional Literature, 1993, Liquid Image Corporation.

"Webster New World Dictionary" 3rd College Edition. 1988, p. 168.

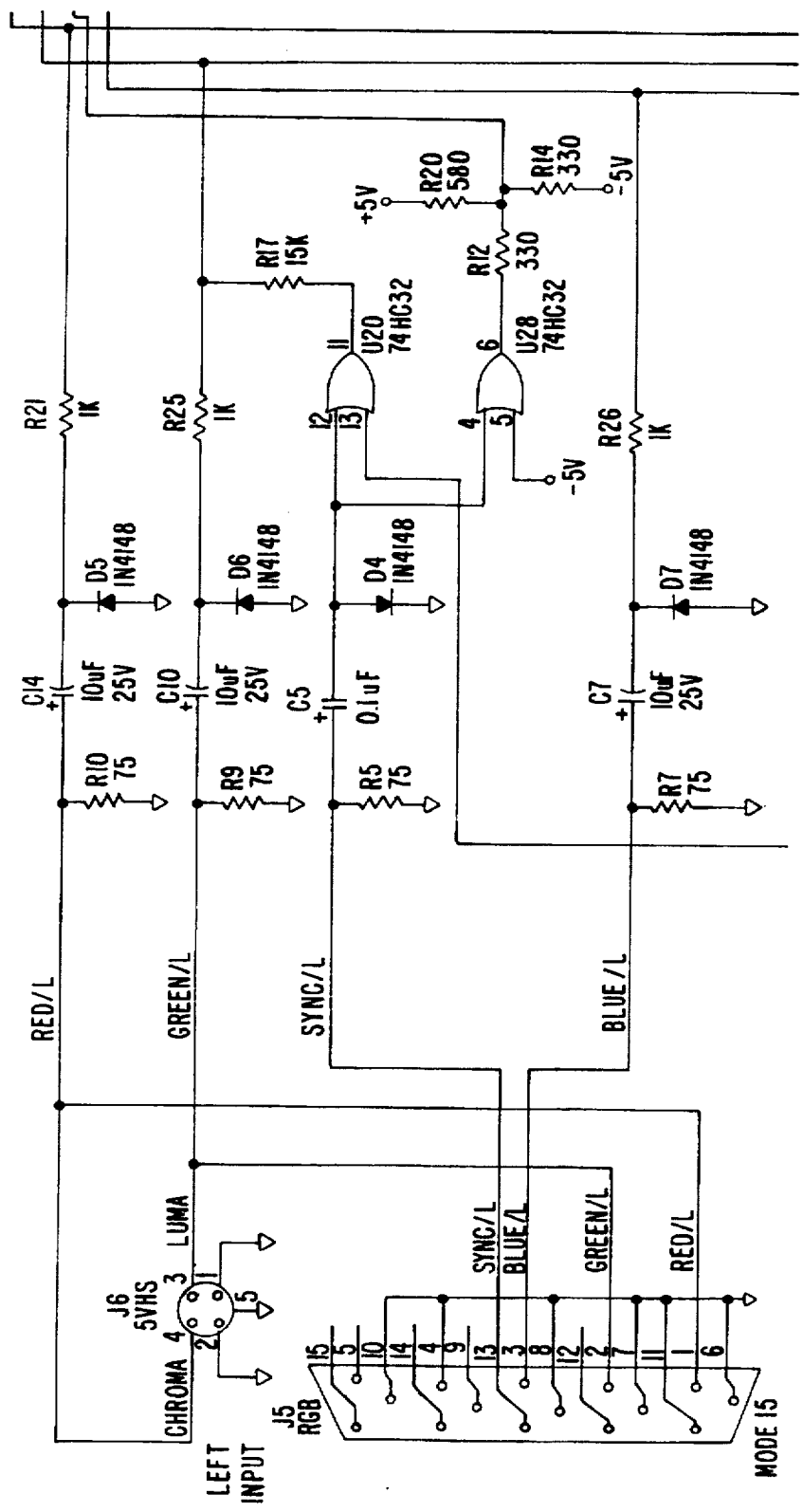

HEAD-MOUNTED VISUAL DISPLAY APPARATUS

BACKGROUND OF THE INVENTION

The present invention relates generally to a visual display apparatus. More particularly, the invention provides a head-mounted display apparatus to be worn by a user.

A head-mounted visual display apparatus provides a video image to an individual wearing the apparatus. The display apparatus includes one or more visual display devices to supply video data to the user. Often, separate display devices are provided for each of the user's eyes. Stereo images can be displayed by making small adjustments to the image provided to each eye.

The signal supplied to the display apparatus can come from any video source, including conventional television and videotape units. More commonly, the video data is computer-generated. Head-mounted displays find particular use in virtual reality systems. In a virtual reality system, the user typically wears a head-mounted display apparatus, which is often in the form of a helmet. The display apparatus commonly includes a shell that blocks out all outside views so that everything the user sees is presented by the computer. Sophisticated systems may include a position sensor on the head-mounted display to enhance the quality of the virtual reality presentation. In these systems, the image is continually adjusted so that the user's view of the virtual universe changes with the motion of his or her head.

Known head-mount systems position the lenses inside the shell at a fixed distance from the user's eyes. The fixed distance should be as close to the user's eyes as possible to provide the largest field-of-view. Such positioning presents a problem, however, when the head-mount system is used by both glasses and nonglasses wearers.

The ideal lens position for a user not wearing glasses is directly in front of the user's eyes. Systems setting the fixed distance in this position, however, cannot be used by persons wearing glasses. The glasses interfere with the lens placement. The ideal lens position for a user wearing glasses is directly in front of the glasses, which is approximately an inch in front of the user's eyes. This fixed position sacrifices field-of-view though unless larger, more expensive lenses are used. Thus, many present head-mount systems sacrifice optimal field-of-view characteristics for compatibility between glasses and nonglasses wearers. Of course, some head-mounted visual display systems include vision correction systems making eyeglasses unnecessary. These systems are more expensive and complex, and cannot adequately correct for vision problems such as an astigmatism.

Some military head-mount equipment provides fore and aft adjustment of lenses and displays using a threaded screw mechanism. An attached knob allows a user to control movement of the lenses. When the knob is turned in one direction, the lenses are moved further from the user's eyes to allow for use of glasses. When the knob is turned in the opposite direction, the lenses are moved closer to the user's eyes. Such a threaded movement mechanism is less than ideal for at least several reasons. For one, the user must learn where the adjustment mechanism is. For another, the turning motion required to move the lenses forward and backward is difficult and annoying for some people. Persons suffering from arthritis, for example, often do not have the dexterity required to make such a precision adjustment with their fingers.

A known head-mount system developed by Kaiser Electro-optics allows the shell portion to be adjusted forward and backward. The forward and backward movement allows eye relief, but is mainly incorporated for sanitary purposes, allowing the shell to be removed from the headband so that each user can employ his or her own individual headband. To move the shell, two tabs on opposite sides of the shell near a user's ears are simultaneously depressed to release a lock on the forward and backward movement of the shell.

In addition to the fact that this procedure is not at all intuitive, it requires three hands to perform effectively: two to depress the sides tabs and a third to move the shell. Additionally, since the shell is designed to separate from the headband, there is no mechanism to prevent the user from inadvertently pulling the shell to far out off of the headband. This problem is compounded further by relative difficulty of adjusting the shell with only two hands.

General Reality produces another headmount system that allows fore and aft movement of the shell. The General Reality headmount system includes two flexible rails on each side of the helmet that connect the shell to the headband portion of the system. The shell slides forward and backward on the rails to accommodate glasses or adjust the level of immersion.

A major drawback with this approach, however, is that the user must apply an equal amount of force to each side of the helmet when moving the shell. Otherwise, the shell becomes twisted and does not move at all. This problem is compounded further by the slightly flexible railings used.

Another problem with current head-mounted visual display systems is that known systems are limited in their use because of compatibility problems. Current systems operate on a single type of video signal such as an RGB signal, a luma chroma (y/c) signal, or a composite signal. Thus, for example, if a user's application provides an RGB video signal and his head-mount system is designed to operate on a y/c signal, the user must design or purchase a special converter box to convert the RGB signal to a y/c signal. These converter boxes can be relatively expensive because in addition to signal conversion, the boxes often include filters and amplifiers to maintain signal quality. Different cable types are also required for each different type of video signal. Thus, the user in the above example will use one type of cable to transmit his RGB application signal to the converter box and a second type of cable to transmit the converted y/c signal to his head-mount system. Using multiple cable types in a single head-mount system adds complexity and expense to the system.

Compatibility problems are further compounded by the availability of different synchronization options for RGB and signals and the use of stereo and mono video signals. As another example, a user's application may provide an RGB video signal synchronized on green and a stereo video signal, while his head-mount system is designed to operate on a mono RGB signal with a separate synchronization signal. Since known head-mount systems cannot accommodate this user, he must purchase or design a stereo-to-mono conversion unit and a unit to convert the RGB sync-on-separate signal to an RGB sync-on-green signal. Using several various conversion units is both expensive and cumbersome. Controls for the various boxes and the user's head-mount system are all located in different places making signal adjustments tedious and frustrating.

SUMMARY OF THE INVENTION

The invention solves the problems of the prior art and provides an improved head-mounted visual display apparatus that may find particular use in a virtual reality system.

According to one aspect of the invention, the shell encases the visual display and is mounted to the headband, which adjusts to the user's head with a mounting device that allows the shell to slide toward or away from the user's face. The mounting device includes a mounting bracket that allows attachment to the headband and a support member that slides across the mounting bracket. The support member is attached to the shell allowing the shell to be moved toward or away from the headband. Additionally, the support member allows for the attachment of video display units.

Another aspect of the invention solves the compatibility problems associated with prior art head-mounted visual display systems through the use of a single external control box. The control box provides a single interface between the external world and the head-mounted visual display, and includes controls to select between y/c and RGB video signals as well as the type of synchronization signal used. The box has input jacks compatible with the cable types of several different video signals and outputs a video signal to the head-mount system on a single common cable type. The control box also provides for easy access to an ON/OFF switch and appropriate controls to allow a user to select between displaying stereo and mono video signals without suffering a loss in signal quality. The control box provides for all of the above-described functionality in a single, easily accessible unit.

DESCRIPTION OF SPECIFIC EMBODIMENTS

Figure 1:
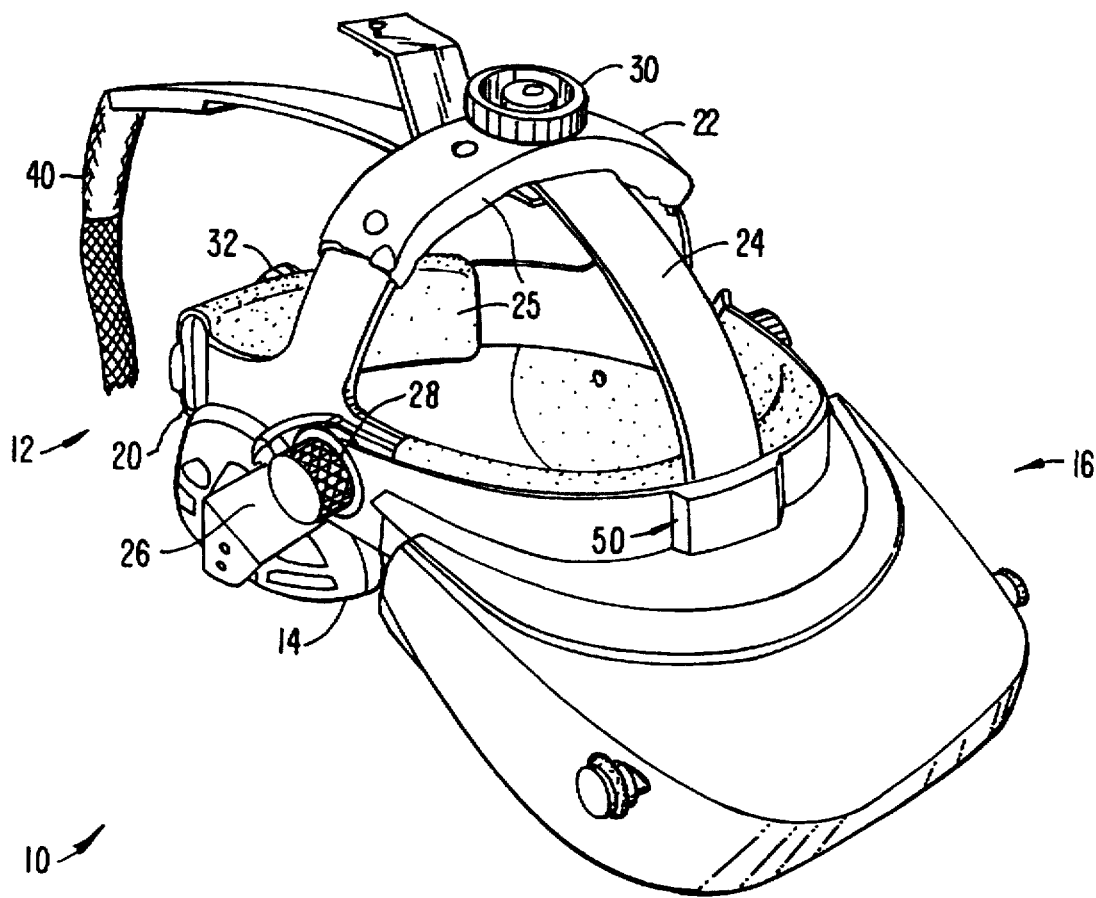
FIG. 1 is a perspective view of a head-mounted visual display apparatus according to one embodiment of the present invention.
Figure 2A:
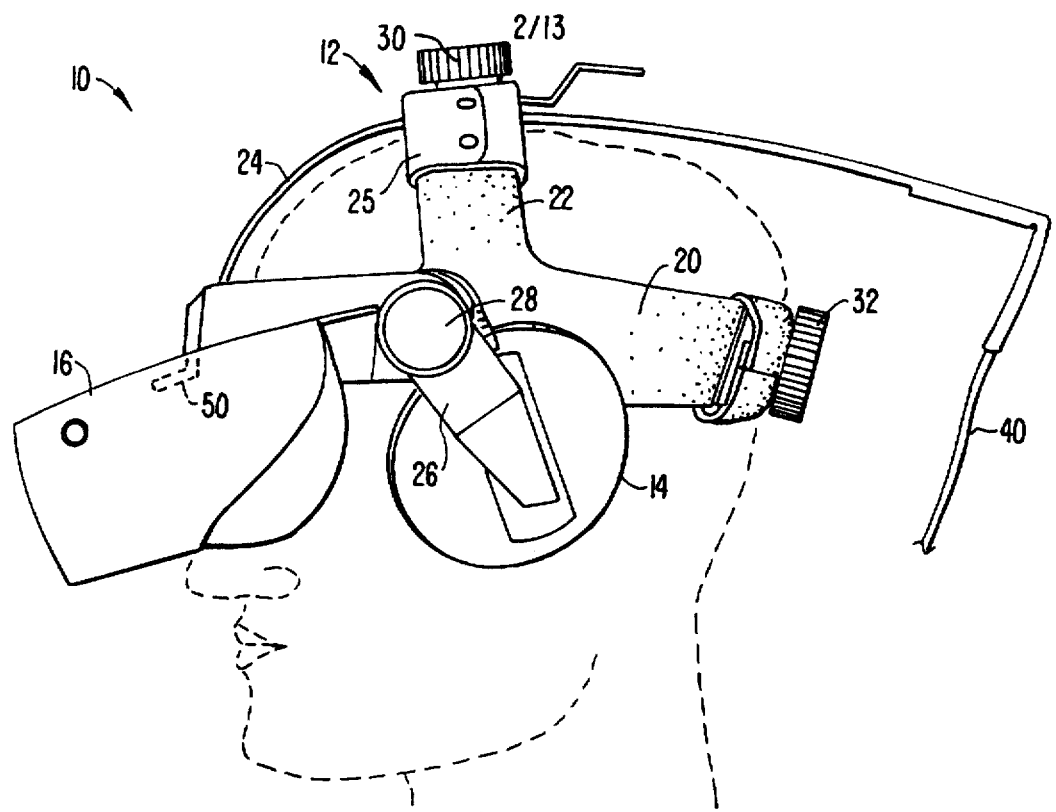
FIGS. 2(a) and 2(b) present side views of the apparatus shown in FIG. 1 in place on a user's head.
Figure 2B:
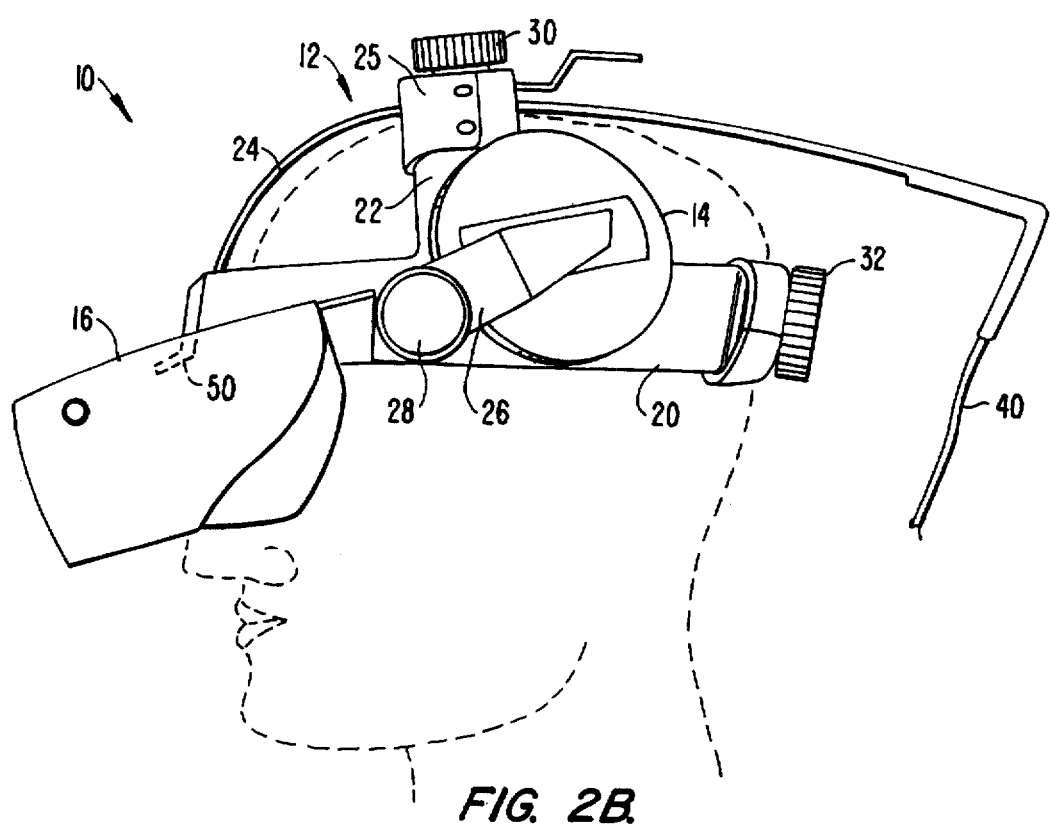

FIG. 1 depicts a head-mounted visual display apparatus 10. Head-mounted visual display apparatus 10 includes a head mount 12, which attaches the apparatus to a user's head, headphones 14 for reproducing sound, and a display shell 16, which encases the visual display and blocks outside views. Head mount 12 includes a headband 20, a cross member 22, a top bar 24, and pads 25 for ensuring a comfortable fit. Headphones 14 are suspended from headband 20 by a headphone mount 26. Headphone mount 26 is attached to headband 20 at a pivot 28, which allows for adjustment of the headphone position to conform to the particular shape of the wearer's head. Additionally, as shown in FIG. 2(b), headphones 14 can be pivoted upwards away from the user's ear when not in use.

A first sizing knob 30, at the junction of cross member 18 and top bar 20, adjusts the length of cross member 22 above the wearer's head. A second sizing knob 32 located at the back of headband 15 adjusts the size of headband 20. Sizing knobs 30 and 32 cooperate with ratcheting mechanisms (not shown). The ratcheting mechanism can be implemented as well known to those of skill in the art or as described more fully in issued U.S. Pat. No. 5,321,416 incorporated herein by reference and assigned to Applicants.

A cable 40 is routed under top bar 24, at the back of head mount 12. Top bar 24 provides a convenient means for routing the cable to the back of the apparatus to keep it out of the wearer's way. Additionally, top bar 24 and cable 40 counterweight display units 22 and 24 so that the apparatus balances more evenly on the wearer's head.

Display shell 16 encases a pair of video display units, not shown in FIG. 1, that are placed in front of the user's eyes and display the image represented by the electrical signals transmitted over cable 40. Each video display unit includes a display and a lens. A rubber bumper is also encased within shell 16 around the lenses. The rubber bumper extends outwards from the lenses and is larger in circumference than a user's eyes to protect his/her eyes from actual contact with the lenses. In the preferred embodiment the displays are 1.3 inch diagonal active matrix thin film transistor LCD displays manufactured by Seiko Epson. However, one skilled in the art will recognize that many different types of video display units may be used such as monochrome LCD displays, color or monochrome CRTs, and the monochrome CRT displays used with a color wheel described more fully in U.S. patent application Ser. No. 08/064,514 filed on May 19, 1993, assigned to the present applicants, and incorporated herein by reference.

Figure 3:
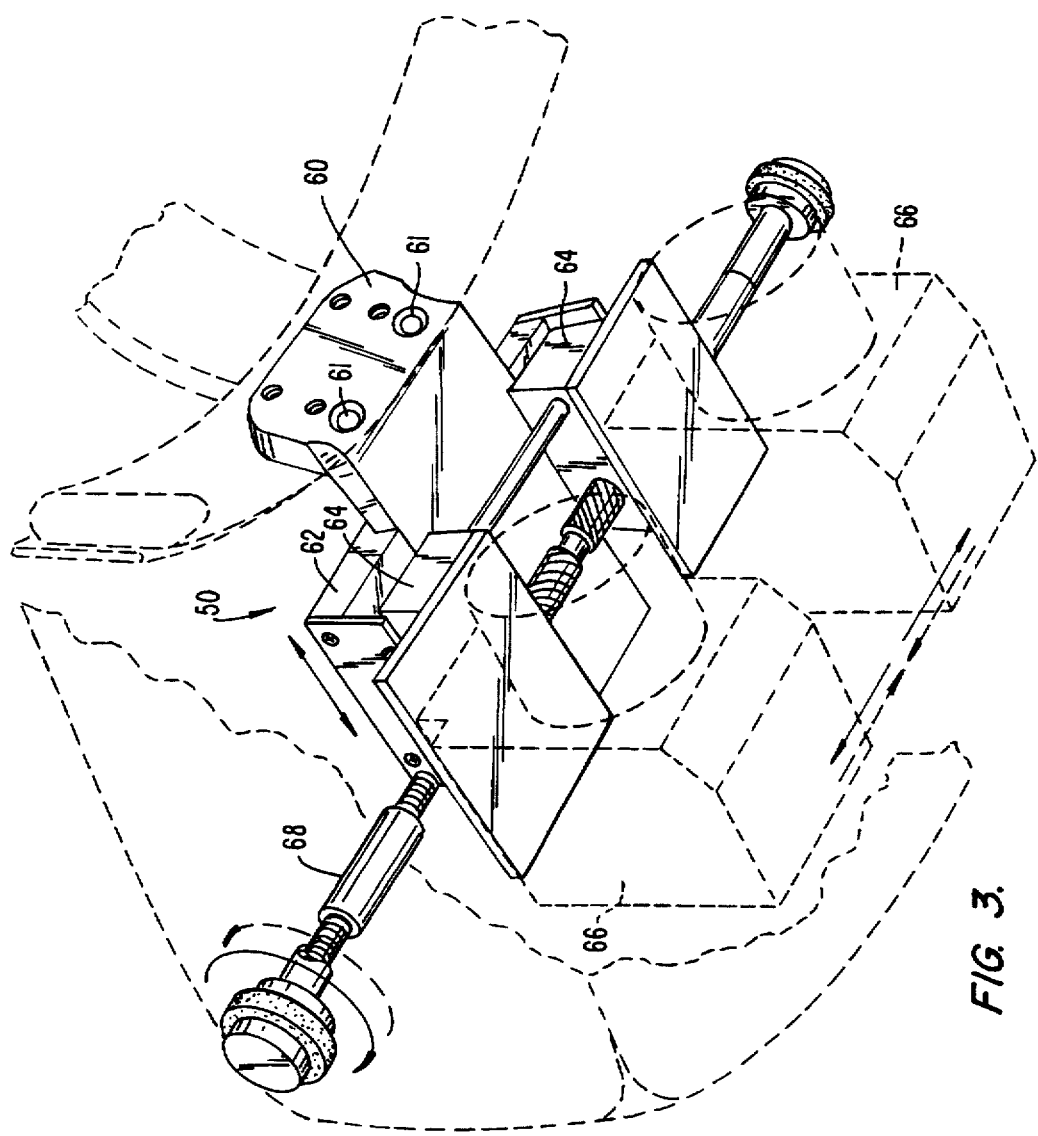
FIG. 3 is a perspective view of one embodiment of the mounting device used to attach the shell to the headband of apparatus shown in FIG. 1.
Figure 4A:
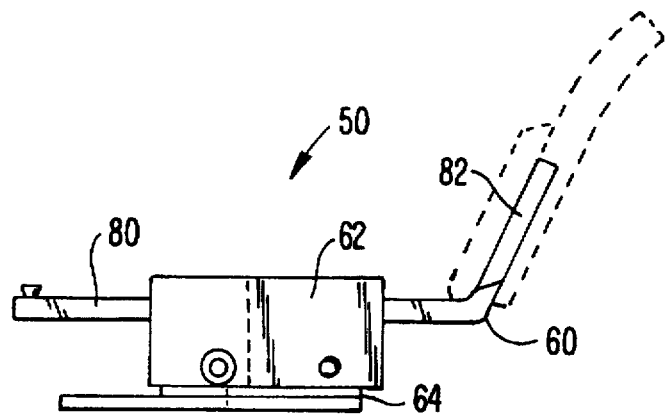
FIGS. 4(a) and (b) are side and front elevational views, respectively, of the mounting device shown in FIG. 3.
Figure 4B:
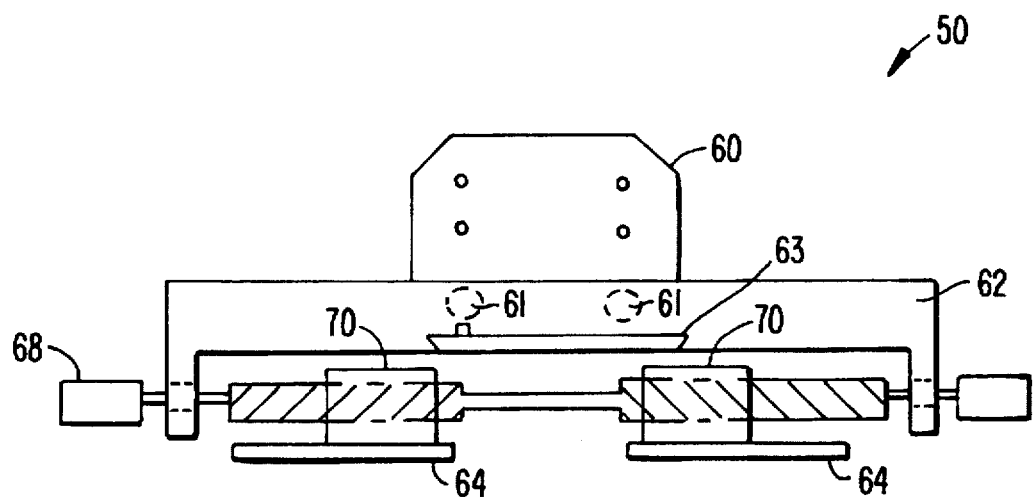

Display shell 16 attaches to headmount 12 through mounting device 50, which is partially shown in FIG. 1 and is shown in detail in FIGS. 3, 4(a) and (b), 5(a) and (b), and 6(a) and (b). Mounting device 50 includes a mounting bracket 60 that is attached to the center of the front portion of headmount 12; a support member 62 that is attached to shell 16 at two locations on the top of the support member and that includes a slot 63, which allows support member 62 to slide back and forth along mounting bracket 60; display supports 64, which allow attachment of video display units 66, through their respective housings, to mounting device 50; and an interpupillary distance (IPD) adjustment mechanism 68 that adjusts the distance between the pair of video display units.

Each display support 64 attaches to mounting device 50 through IPD adjustment mechanism 68 and a nut 70. Since IPD adjustment mechanism 68 has opposite direction threads on the sides on which opposing nuts 70 are positioned, turning IPD adjustment mechanism 68 clockwise decreases the distance between the video displays, while turning it counter-clockwise increases the distance between the displays. IPD adjustment mechanism 68 passes through and turns within a circular bore on each end of support member 62. In addition to nuts 70, a block 76 with a hole in its center slides across a support bar 74 to attach each display support 64 to mounting device 50.

Mounting bracket 60 includes an elongated body portion 80 and an upper head portion 82. Head portion 82 is preferably at an angle of between 45 and 90 degrees to body portion 80, and most preferably, head portion 82 is at an angle of around 70 degrees. Experimentation has shown that the slightly downward viewing position provided by an angle of approximately 70 degrees is the most comfortable position for a user. Body portion 80 is essentially flat with edges that slant inwards from the top surface of body portion 80 to the bottom surface of body portion 80. The edges are slanted such that body portion 80 fits within slot 63, which has similarly slanted edges.

Figure 5A:
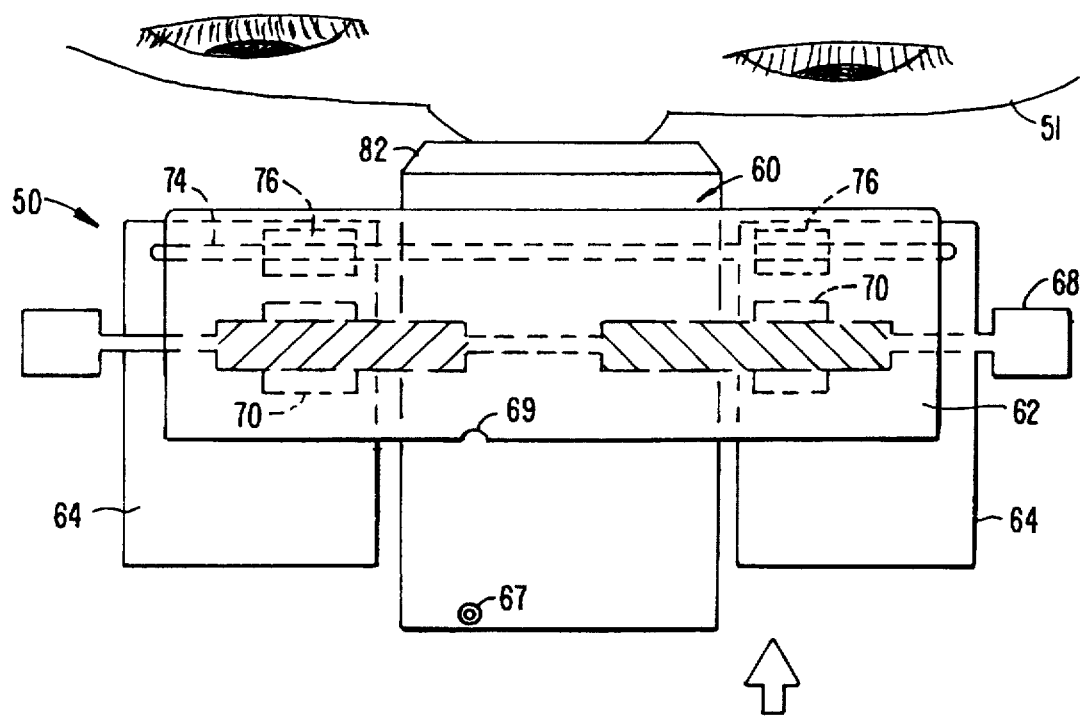
FIGS. 5(a) and (b) are top views of the mounting device shown in FIG. 3 as it is positioned so that the shell is closest to user's face and farthest from the user's face, respectively.

FIG. 5(a) shows mounting bracket 60 positioned such that support member 62 (and thus shell 16, which is attached to support member 62) is relatively close to the user's face. This is the best position for viewing images shown on the video display units. To place shell 16 in this position, the user pushes shell 16 toward his/her face 51 in the direction of the arrow such that support member 62 slides along mounting bracket 60 until support member 62 contacts upper section 82 of mounting bracket 60.

Figure 5B:
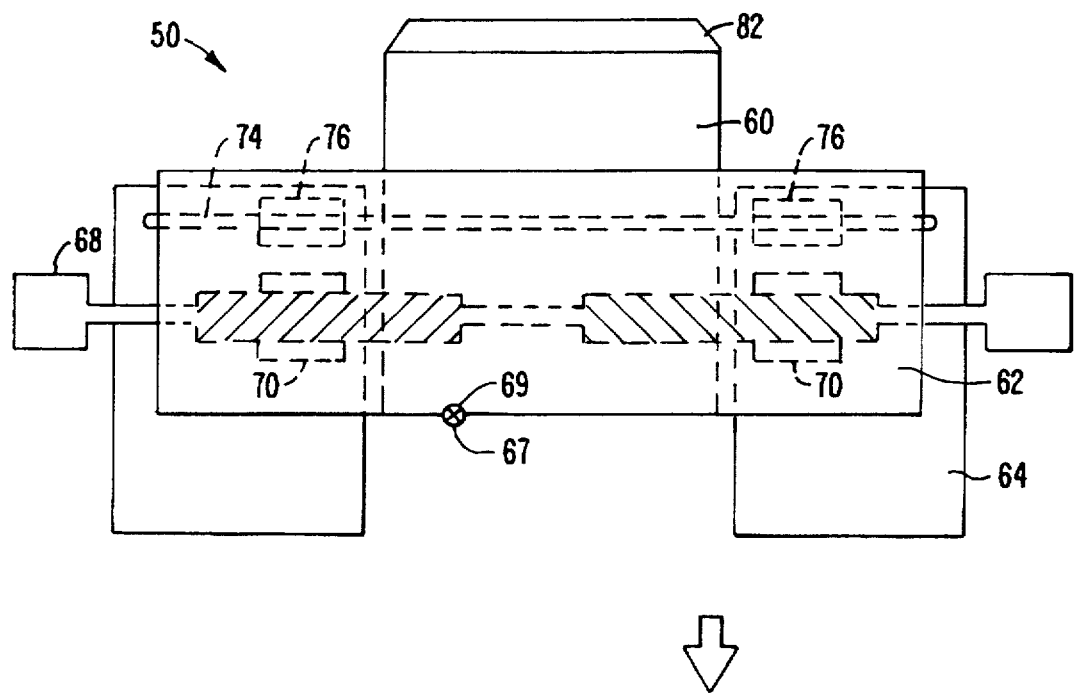

FIG. 5(b) shows mounting bracket 60 positioned such that support member 62 (and thus shell 16) is somewhat distanced from the user's face. This is the position of shell 16 when head-mounted visual display apparatus 10 is placed on and taken off the user's head. To place shell 16 in the position of FIG. 5(b), the user pushes shell 16 away from his/her face in the direction of the arrow until support member 62 is stopped by stopper 67. In one embodiment, the coefficient of friction between mounting bracket 60 and slot 63 is sufficient to offer enough resistance movement of shell 16 so that when the user stops applying force to shell 16 it will stay in its set position. In the preferred embodiment, support member 62 has an indent 69 to accept stopper 67 so that support member 62 is flush with the end of mounting bracket 60 in this position. Stopper 67 is a screw that screws into mounting bracket 60.

Figure 6A:
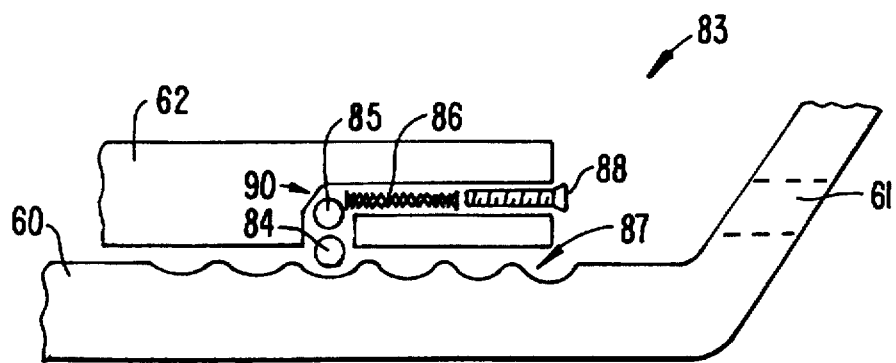
FIG. 6(a) is a side view of a partial cutaway of a first embodiment of a detent mechanism that can be employed in the mounting device shown in FIG. 3.

Preferred embodiments of mounting device 50 include a detent mechanism that positions shell 16 in one of a fixed number of positions relative to headband 20. FIG. 6(a) is a cut-away view of a portion of mounting device 50 showing one embodiment of a ball bearing detent mechanism 83. Detent mechanism 83 includes a ball bearing 84 which rests in a trough of an undulated upper surface 87 of the elongated body portion of mounting bracket 60. Undulated upper surface 87 includes a plurality of indents aligned in a row on mounting bracket 60. Each indent is spherical in shape and is slightly larger in circumference than ball bearing 84 which rests in it.

One or more detent mechanisms 83 can be included in mounting device 50. If a single, detent mechanism is used, it is preferably positioned such that the row of indents are centered on mounting bracket 60. If two or more detent mechanisms are used, a corresponding number of rows of indents are employed each preferably being evenly spaced from each other and parallel to each other.

When shell 16 is moved relative to headband 20, ball bearing 84 moves from one undulation of upper surface 87 to another. Screw 88 sets the tension or resistance between ball bearing 84 and upper surface 87. When screw 88 is tightened, coil spring 86 is compressed. Ball bearing 85 is then pushed against slanted wall 90 toward ball bearing 84 increasing the amount of force required to move mounting bracket 60 into another position. Loosening screw 88 has the opposite effect. Access to screw 88 is from inside head band 20 through openings 61 in upper head portion 82 of mounting bracket 60.

Figure 6B:
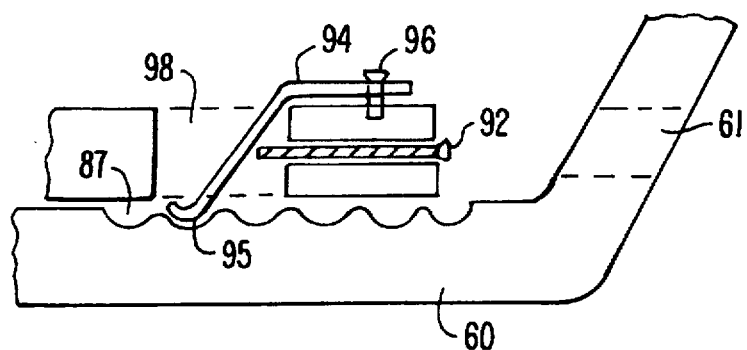
FIG. 6(b) is a side view of a partial cutaway of a second embodiment of a detent mechanism that can be employed in he mounting device shown in FIG. 3.

The preferred embodiment of the present invention includes a clip spring detent mechanism 91 as shown in FIG. 6(b). Clip spring detent mechanism 91 includes a clip spring 94 that passes through an opening 98 in support member 62 to contact mounting bracket 60. A rounded bottom portion 95 of clip spring 94 slides in and out of undulations (indents) in surface 87 as shell 16 is moved fore and aft.

Clip spring 94 is resilient and exerts a continuous force against surface 87. The amount of exerted force is set by a screw 92. Tightening screw 92 decreases the amount of force required to move rounded bottom portion 95 from one undulation to the next, while loosening screw 92 increases the force. Access to screw 92 is through openings 61 in upper head portion 82 of mounting bracket 60. A screw 96 fastens clip spring 94 to support member 62.

The use of detent mechanisms 83 or 91 to set the fore/aft position of shell 16 is preferable over relying on friction between mounting bracket 60 and slot 63. The detent mechanisms are inherently more reliable and consistent. If detent mechanisms are not used, over an extended period of time, the friction between slot 63 and mounting bracket 60 will lessen making it difficult to maintain shell 16 in a desired set position. Either detent mechanism can provide a good, consistent adjustment mechanism and they are both adjustable to individual user's preferences. Also, experimentation has shown that users prefer the feel of moving shell 16 with detent mechanism as oppose to without it. Experimentation has also shown that 6–10 undulations covering between one-half an inch to just over an inch of upper surface 87 is a sufficient range of movement to allow for users to select optimal positions for glasses or non-glasses use.

Figure 7:
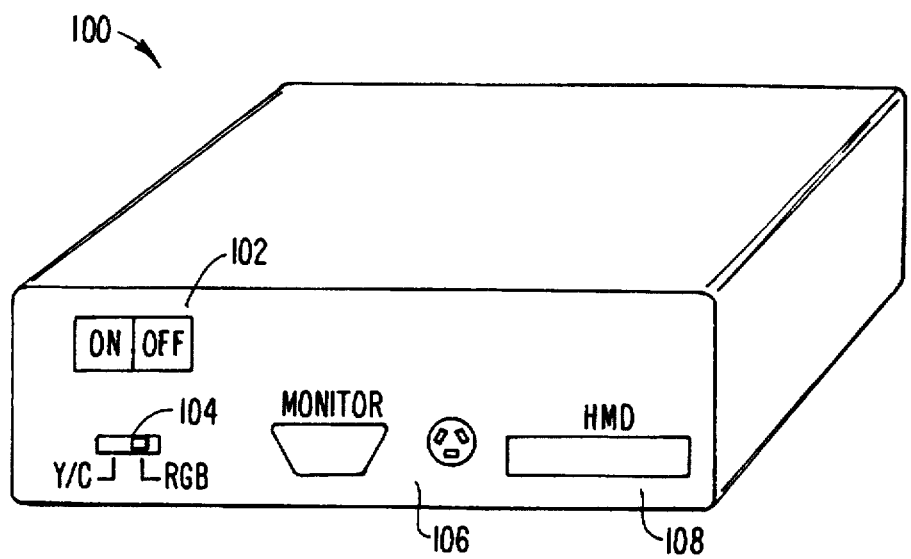
FIG. 7 is a perspective view of the external control box that is part of the present invention.

FIG. 7 is a perspective view of external control box 100 that is part of the present invention. The front face of external control box 100 includes an ON/OFF switch 102 for switching power to head-mounted visual display apparatus 10 ON and OFF, a two-position switch 104 for selecting whether video display units 66 operate from a y/c signal or an RGB signal, monitor jacks 106 that allow the video signal to be output to an external video monitor, and a head-mount display (HMD) connector 108 for connecting cable 40 from head-mounted visual display apparatus 10 to external control box 100.

Figure 8:
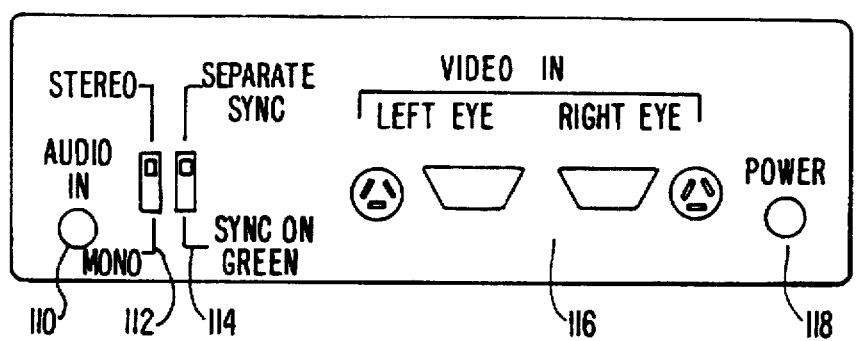
FIG. 8 is a rear elevational view of the external control box shown in FIG. 7.

FIG. 8 is a rear elevational view of external control box 100 shown in FIG. 7. The rear face of external control box 100 includes an audio jack 110 for receiving a stereo audio signal, a two-position switch 112 for selecting whether video display units operate in mono or stereo mode, a two-position switch 114 for selecting whether the RGB video signal is synchronized on the green signal or separately, video input jacks 116 for the left and right video display units, and a power jack 118 for receiving a DC power signal.

Monitor jacks 106 and video input jacks 116 include two types of connectors to eliminate compatibility problems. The circular connector is a 4-pin DIN plug commonly used for a y/c signal while the rectangular connector is for an HD-15 VGA interface commonly for an RGB signal. HMD connector 108 connects head-mount system 10 to control box 100. Thus, a user can plug any of several types of cables into control box 100 and not worry about cable incompatibility problems with head-mount system 10.

Figure 9B:
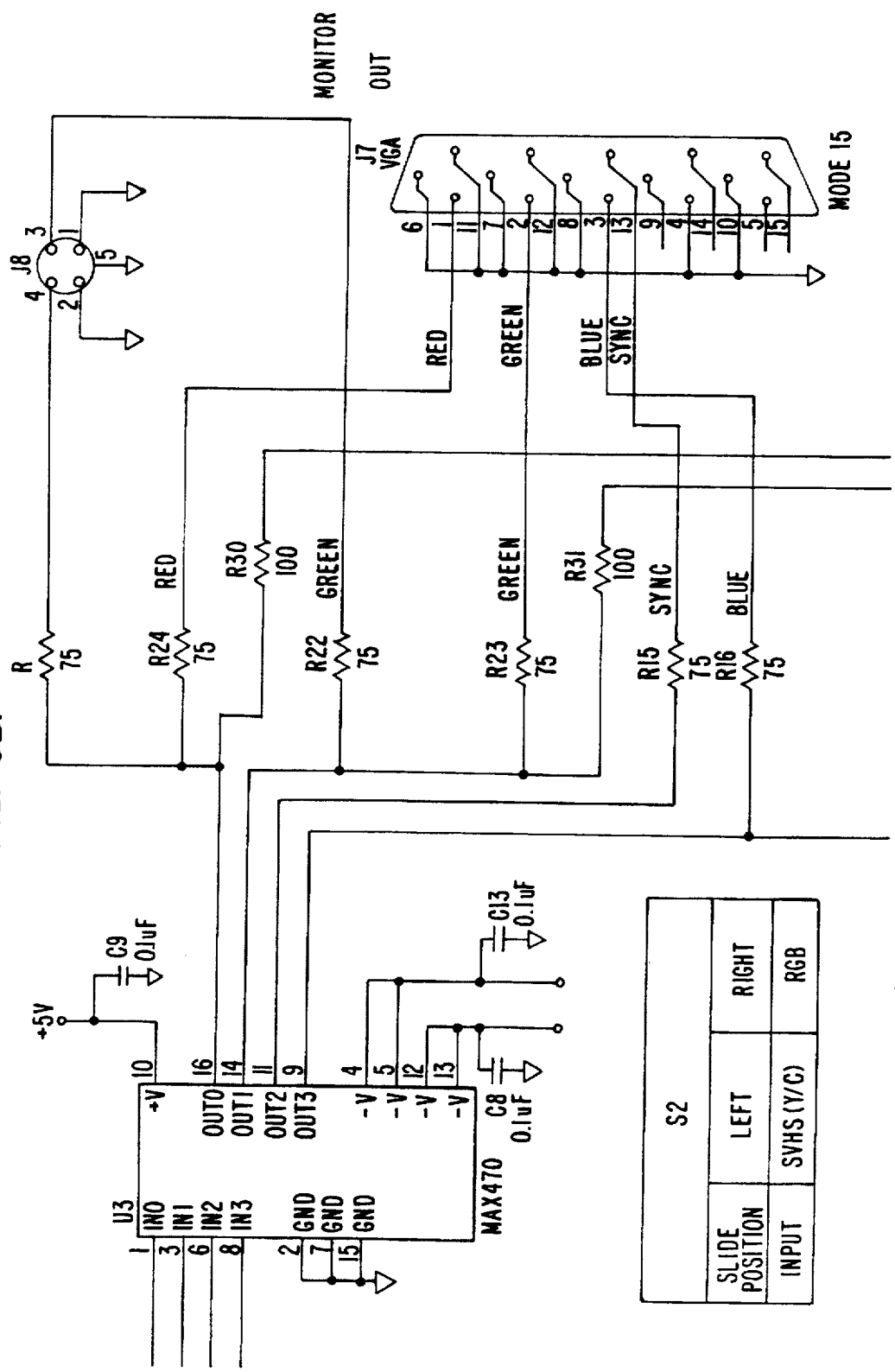
FIG. 9 is a schematic diagram of the preferred embodiment of circuitry within the external control box shown in FIGS. 7 and 8.
Figure 9C:
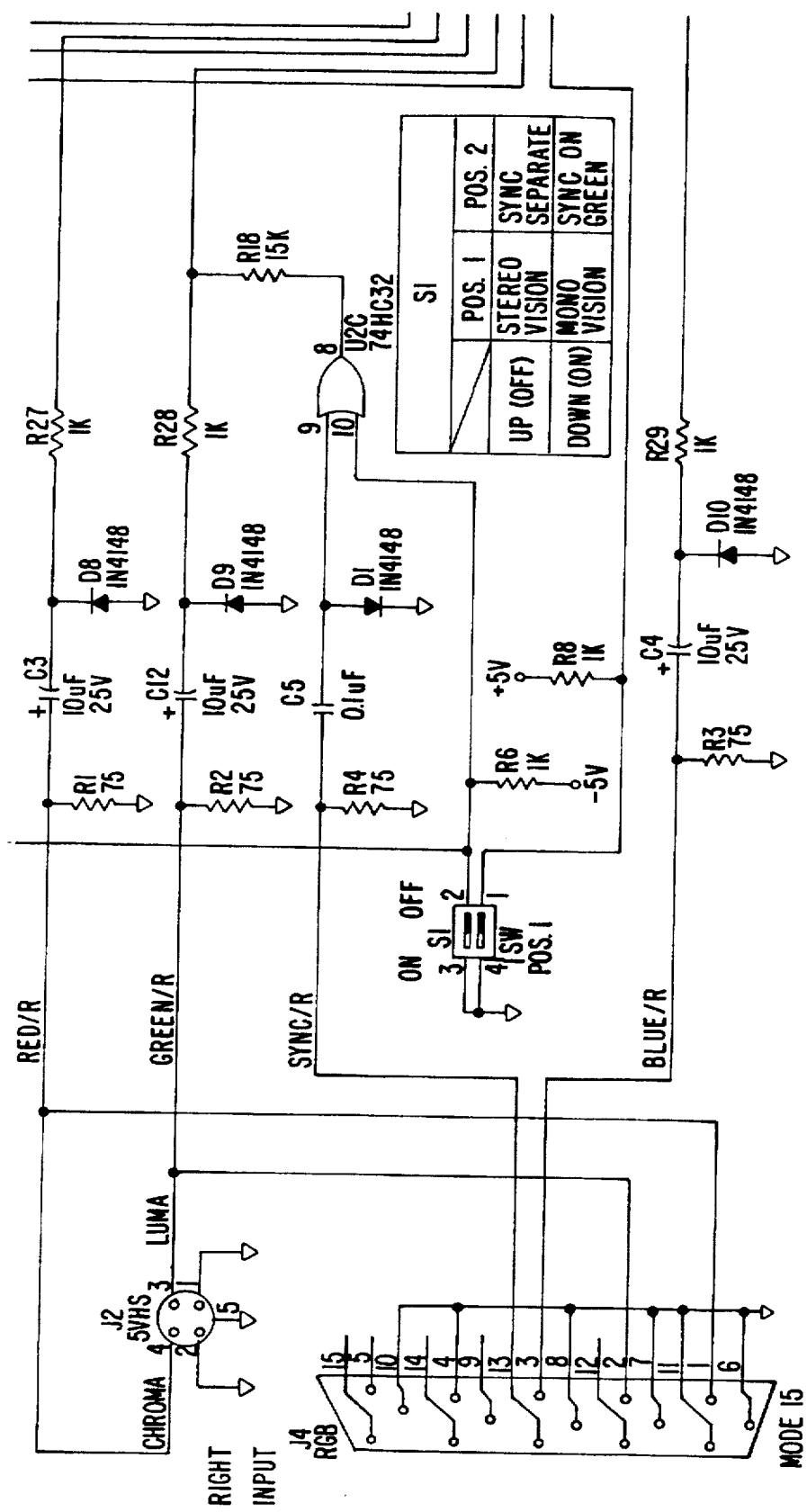
Figure 9D:
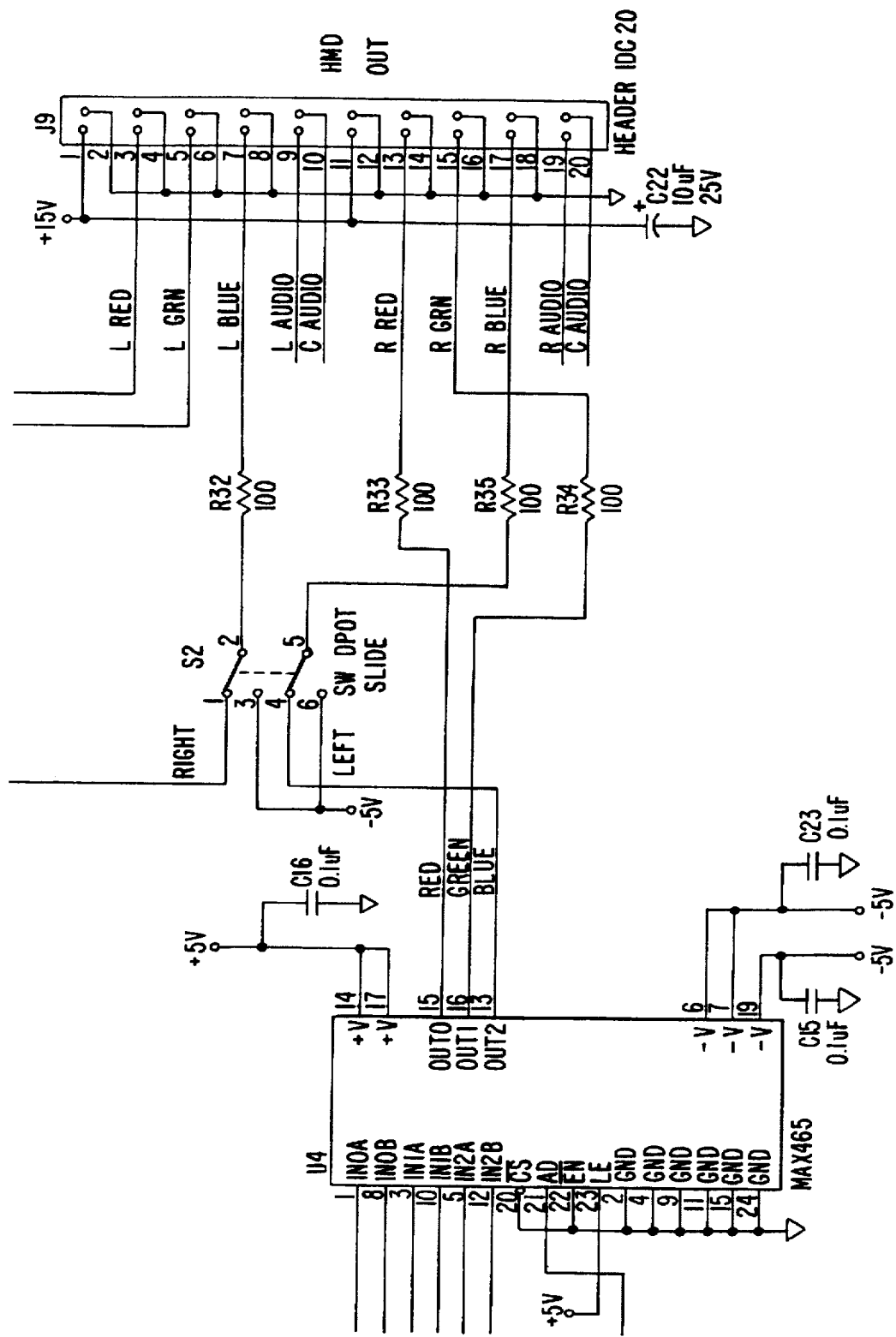
Figure 10:
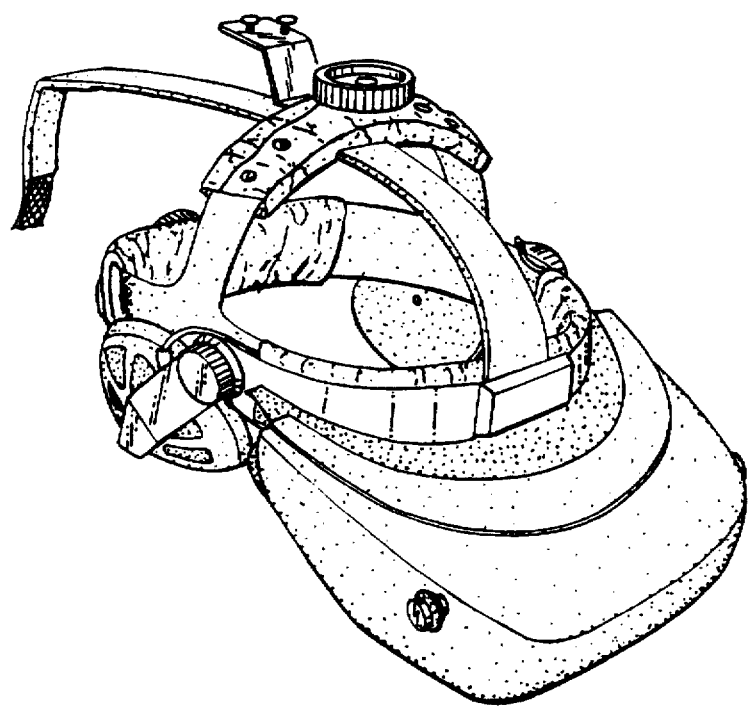
FIG. 10 is a front perspective view showing the design of the head-mount apparatus.
Figure 11:
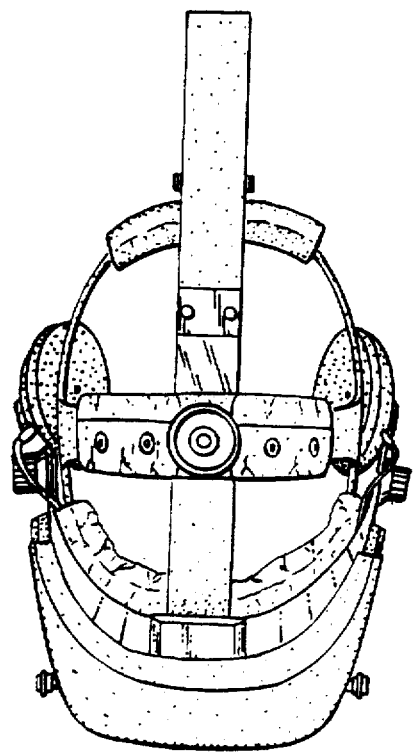
FIG. 11 is a top plan view thereof.
Figure 12:
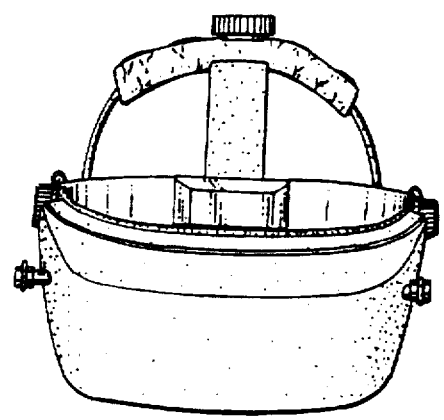
FIG. 12 is a front elevational view thereof.
Figure 13:
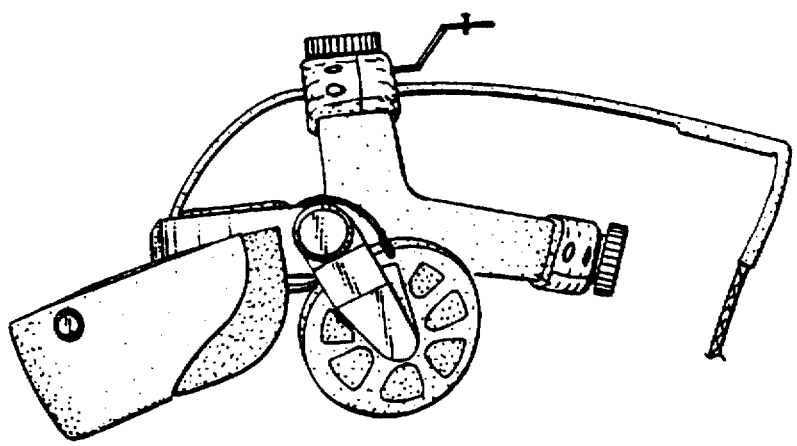
FIG. 13 is a left side elevational view thereof, the right side elevation view being a mirror image.
Figure 14:
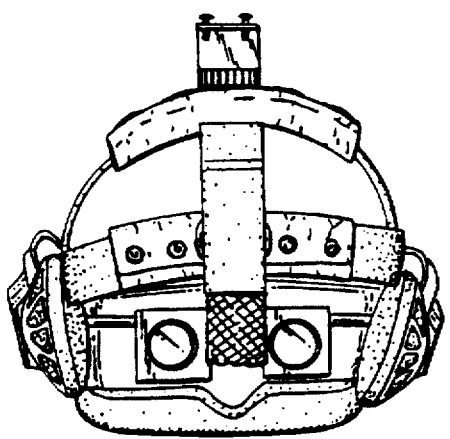
FIG. 14 is a rear elevational view thereof.
Figure 15:
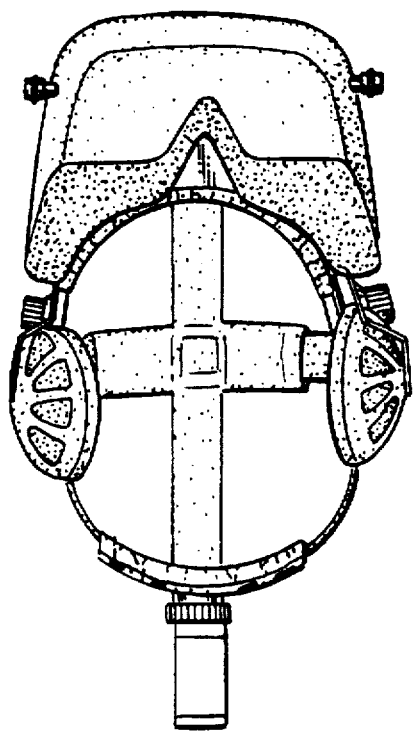
FIG. 15 is a bottom plan view thereof.

FIG. 9 is a schematic diagram of the preferred embodiment of electronic circuitry within external control box 100 shown in FIGS. 7 and 8. The circuitry shown in FIG. 9 accepts left and right video signal inputs and outputs a signal on HMD connector 108. In response to a user's selection through two-position switch 112, head-mount system 10 can operate from either a stereo or mono video signal. When switch 112 is set so that head-mount system 10 operates from a mono signal, the video signal input on the left channel is split and amplified onto the right channel. When switch 112 is set so that the system operates from stereo signals, the video signal input on the left channel is output on the left LCD display and the video signal on the right channel is output on the right LCD display.

Other electronic circuitry, not shown, in the head mount system includes an IR3Y12 chip manufactured by Sharp and associated timing circuitry that allows head-mount system 10 to operate off an input video signal of the type selected by switch 104. The IR3Y12 chip converts the video signal input at jacks 116 to an RGB NTSC timing signal having positive and negative versions that is a common operating signal for LCDs. In one embodiment, the IR3Y12 chip is located near video display units 66 within shell 16.

The above description is illustrative and not restrictive. Many variations of the invention will become apparent to those of skill in the art upon review of this disclosure. For example, mounting bracket 60 can be implemented with a plurality of rigid brackets centered between the left and right sides of headband 20. The scope of the invention should, therefore, be determined not with reference to the above description, but instead should be determined with reference to the appended claims along with their full scope of equivalents to which those claims are rightfully entitled.

What is claimed is:

1. A head-mounted visual display apparatus comprising:
   (a) a head mount to hold the apparatus on a user's head;
   (b) a video display unit for displaying visual images to the user;
   (c) a mounting device configured to couple said video display unit to said head mount, said mounting device including:
      a mounting element coupled to said head mount at a position substantially centered between a left and right side of said head mount; and
      a support member, coupled to said video display unit and movably coupled to said mounting element so that said video display unit can move toward and away from the user as said support member moves along said mounting element; and
   (d) a shell encasing said video display unit and coupled to said support member so that a force can be applied to said shell while said head mount is on said user's head to pull said shell away from said user's head thereby moving said video display unit away from said user and to push said shell toward said user's head thereby moving said video display unit closer to said user wherein said shell moves independent of said head mount.

2. The head-mounted video display apparatus of claim 1 wherein said shell can be moved toward or away from said user while the head-mounted visual display apparatus is secured to said user's head by only said head mount.

3. A head-mounted visual display apparatus comprising:
   (a) head mount to hold the apparatus on a user's head;
   (b) a video display unit for displaying visual images to the user;
   (c) a mounting device configured to couple said video display unit to said head mount, said mounting device including:
      a mounting element coupled to said head mount at a position substantially centered between a left and right side of said head mount; and
      a support member, coupled to said video display unit and movably coupled to said mounting element so that said video display unit can move toward and away from the user as said support member moves along said mounting element;
   wherein the user can move said support member by applying a linear force to said support member along the user's line of sight while said head mount is secured on the user's head and wherein said support member moves independent of said head mount; and
   wherein said mounting device further comprises a detent mechanism, coupled to said support member, comprising a position holding device and wherein said mounting element includes a plurality of indentations aligned in a row into which said position holding device can fit such that said position holding device moves from a first of said plurality of indentations to a second of said plurality of indentations as said video display unit is moved relative to said head mount.

4. The head-mounted video display apparatus set forth in claim 3 wherein said position holding device comprises a ball bearing and wherein said detent mechanism further comprises a screw and a spring situated between said screw and said ball bearing such that said spring exerts pressure on said ball bearing holding said ball bearing into one of said plurality of indentations absent a stronger force moving said ball bearing out of said one indentation.

5. A head-mounted visual display apparatus comprising:
   (a) a head mount to hold the apparatus on a user's head;
   (b) a video display unit for displaying visual images to the user; and
   (c) mounting means for coupling said video display unit to said head mount, said mounting means including:
      a mounting bracket coupled to said head mount at a position substantially centered between left and right sides of said head mount;
      a support member, coupled to said video display unit and slidably coupled to said mounting bracket, so that said video display unit can slide toward and away from the user as said support member slides along said mounting bracket; and
      a detent mechanism, coupled to said support member, comprising a position holding device;
   wherein said mounting bracket includes a plurality of indentations aligned in a row into which said position holding device can fit, said detent mechanism coupled such that said position holding device moves from a first of said plurality of indentations to a second of said plurality of indentations as said video display unit is moved relative to said head mount; and
   wherein said position holding device comprises a clip spring having a first end coupled to said support member and a second end conformably fitted to one of said plurality of indentations, said clip spring being predisposed to exert a force sufficient to hold said second end in one of said plurality of indentations absent a stronger force moving said second end out of said one indentation.

6. The head-mounted video display apparatus set forth in claim 5 wherein said detent mechanism further comprises a screw having an end abutting a middle portion of said clip spring so that when said screw is tightened force is applied against said clip spring decreasing the amount of force holding said second end in one of said plurality of indentations.

7. The head-mounted video display apparatus set forth in claim 6 wherein said screw extends through a threaded bore in said support member and wherein said mounting bracket includes a bore positioned across from said bore in said support member to allow said screw to be tightened by an instrument passing through said bore in said mounting bracket.

8. The head-mounted video display apparatus set forth in claim 5 wherein said mounting bracket is rigid.

9. A head-mounted visual display apparatus comprising:
   (a) a head mount to hold the apparatus on a user's head;
   (b) a video display unit for displaying visual images to the user:
   (c) a mounting device configured to couple said video display unit to said head mount, said mounting device including:
      a mounting element coupled to said head mount at a position substantially centered between a left and right side of said head mount; and
      a support member, coupled to said video display unit and movably coupled to said mounting element so that said video display unit can move toward and away from the user as said support member moves along said mounting element;
      wherein the user can move said support member by applying a linear force to said support member along the user's line of sight while said head mount is secured on the user's head and wherein said support member moves independent of said head mount; and
      wherein said mounting device further comprises means for moving said support member relative to said mounting element into a fixed number of positions, said moving means comprising a plurality of indentations along said mounting element and engaging means for engaging said support member with one of said plurality of indentations, wherein said engaging means is biased to engage one of said plurality of indentations without the application of an external force.

10. A head-mounted visual display apparatus comprising:
    (a) a head mount to hold the apparatus on a user's head;
    (b) a video display unit for displaying visual images to the user; and
    (c) mounting means for coupling said video display unit to said head mount, said mounting means including:
       a rigid mounting bracket coupled to said head mount at a position substantially centered between left and right sides of the user's head; and
       a support member, coupled to said video display unit and slidably coupled to said mounting bracket, so that said video display unit can slide toward and away from the user as said support member slides along said mounting bracket, said support member including a slot within which said rigid mounting bracket slides.

11. The head-mounted video display apparatus set forth in claim 10 wherein said mounting element includes a stop mechanism to stop said support member from sliding off said mounting element.

12. The head-mounted video display apparatus set forth in claim 10 wherein said mounting element is angled at about 70 degrees so that said shell and video display unit extend slightly downward.

13. The head-mounted video display apparatus set forth in claim 10 wherein said mounting bracket includes an elongated body portion and an upper head portion, wherein said upper head portion is attached to head mount.

14. The head-mounted video display apparatus set forth in claim 13 wherein edges on each side of said elongated body portion of said mounting bracket are angled inwards from an upper surface to a narrow bottom surface, and wherein said slot of said support member has angled edges corresponding to said angled edges of said mounting bracket such that said support member slides across said mounting bracket.

15. The head-mounted video display apparatus set forth in claim 11 wherein said video display unit comprises first and second video displays and wherein said mounting means further comprises:
   a first display mount platform, for mounting said first video display to said mounting means;
   a second display mount platform, for mounting said second video display to said mounting means; and
   an adjustment mechanism to move said first and second display mount platforms thereby adjusting positions of said first and second video displays.

16. A head-mounted visual display apparatus comprising:
    (a) a head mount to hold the apparatus on a user's head;
    (b) a video display unit for displaying visual images to the user; and
    (c) a mounting device configured to couple said video display unit to said head mount, said mounting device including:
       a mounting element coupled to said head mount at a position substantially centered between a left and right side of said head mount; and
       a support member, coupled to said video display unit and movably coupled to said mounting element so that said video display unit can move toward and away from the user as said support member moves along said mounting element;
       wherein the user can move said support member by applying a force to said support member along the user's line of sight while said head mount is secured on the user's head;
       wherein said mounting device further comprises a detent mechanism, coupled to said support member, comprising a position holding device and wherein said mounting element includes a plurality of indentations aligned in a row into which said position holding device can fit such that said position holding device moves from a first of said plurality of indentations to a second of said plurality of indentations as said video display unit is moved relative to said head mount and wherein said detent mechanism automatically secures a selected position of said display unit, as determined by said user moving said shell, such that said display unit does not move relative to said head mount under normal operating conditions.

17. A head-mounted visual display apparatus comprising:
    (a) a head mount to hold the apparatus on a user's head;
    (b) a video display unit for displaying visual images to the user;
    (c) a mounting device configured to couple said video display unit to said head mount, said mounting device including:
       a mounting element coupled to said head mount at a position substantially centered between a left and right side of said head mount; and a support member, coupled to said video display unit and movably coupled to said mounting element so that said video display unit can move toward and away from the user as said support member moves along said mounting element;

wherein the user can move said support member by applying a linear force to said support member along the user's line of sight while said head mount is secured on the user's head and wherein said support member moves independent of said head mount; and (d) a shell that encases said video display unit and that is coupled to said support member so that the user can apply a direct force to said shell by pushing or pulling on said shell to move said support member.

* * * * *